United States Patent [19]

Takata

[11] Patent Number: 5,322,374
[45] Date of Patent: Jun. 21, 1994

[54] ANTIFRICTION ROLLER BEARING

[76] Inventor: Nobuo Takata, 87, Kurotani 5-chome, Yao-shi, Osaka 581, Japan

[21] Appl. No.: 987,274

[22] PCT Filed: Aug. 9, 1991

[86] PCT No.: PCT/JP91/01072
§ 371 Date: Mar. 9, 1993
§ 102(e) Date: Mar. 9, 1993

[51] Int. Cl.$^5$ .................................. F16C 19/38
[52] U.S. Cl. ............................. 384/563; 384/450; 384/571
[58] Field of Search ............... 384/563, 450, 571, 569, 384/565, 564

[56] References Cited

U.S. PATENT DOCUMENTS 4,915,513  4/1990  Orain .......................... 384/571
5,007,747  4/1991  Takeuchi et al. ............ 384/450

FOREIGN PATENT DOCUMENTS 57-17132  4/1982  Japan.

Primary Examiner—Lenard A. Footland
Attorney, Agent, or Firm—Jordan and Hamburg

[57] ABSTRACT

An antifriction roller bearing, in which two sets of units are arranged so as to face each other in an one-axis direction. Each unit comprises an inner ring, an outer ring and rollers, the inner and outer rings being provided respectively with a raceway track of monohyperboloid of revolution about the one axis. The rollers are arranged so as to come into linear contact with the inner and outer raceway tracks and slant to a plane including the one axis at an angle. An energizing means is arranged between both the inner rings or both the outer rings to energize the inner rings or the outer rings so as to narrow down the spacing of the raceway tracks, the outer rings or the inner rings which are not subject to the energizing force being stationary.

1 Claim, 7 Drawing Sheets

ANTIFRICTION ROLLER BEARING

INDUSTRIAL FIELD OF APPLICATION

This invention relates to an antifriction roller bearing which can rotate only in one direction.

PRIOR ART

In general, antifriction roller bearings includes the three types of cylindrical roller bearing, conical roller bearing and self-aligning roller bearing.

With the cylindrical roller bearings, the rollers are in line contact with the inner and outer rings, and a radial load applied on the bearing produces only normal loads on the contact portions.

On the other hand, with the conical roller bearings and the self-aligning roller bearings, a radial load produces a normal load acting vertically on the slanted surface and a tangential load acting in parallel to the slanting surface. But, since a thrust load is always applied to those bearings to prevent the inner and outer rings from displacing in the axial direction, an additional normal component of the thrust force are applied vertically between the rings and rollers, thus producing an additional surface contact pressure. Further, since the normal load acting between the rings and rollers tends to push the rollers out of the raceway from smaller dia. side to larger side, the guide flange must be provided at the larger dia. side to prevent the rollers from being driven out of raceway. But, since the large-dia. end face of the conical rollers is in sliding contact with the guide flange, the PV value contributed by the sliding friction largely restricts the load carrying capacity of the conical type roller bearings.

Problems to be Solved by the Invention

The antifriction roller bearings are often used where a shaft or a journal is rotated in both normal and reverse directions, but, depending on the type of machinery, sometimes used where a shaft or a journal is rotated only in one direction.

The present invention intends to provide an antifriction roller bearing which can be widely used in a variety of machinery, with a larger load capacity than the conventional cylindrical and conical roller bearings and an enhanced rolling performance without producing such a large sliding friction at the large-dia. end face of the rollers as experienced in the conical roller bearing, as well as has a high efficiency of power transmission performance without any possibility of bearing seizure, thus most suitable for high speed rotation.

Means for Solving the Problems

To solve the above problems, an antifriction roller bearing according to the present invention comprises:

two sets of bearing single units each consisting of an inner ring, an outer ring and intermediate rotation bodies, and one set of energizing means; and the inner ring being provided with an inner raceway track of mono-hyperboloid of revolution about one axis;

the outer ring being provided with an outer raceway track of mono-hyperboloid of revolution about the axis;

the inner raceway track and the outer raceway track being oppositely faced with each other to form a raceway whose diameter is larger at one end than at the other end;

the center axes of the intermediate rotation bodies with a cylindrical or conical rolling surface being arranged in a circumferential direction of the raceway at an angle to a cross section including the axis, and the surface of the intermediate rotation bodies being arranged so as to come into linear contact with the inner raceway track and the outer raceway track;

the inner ring or the outer ring rotating only in such a given direction as to roll the intermediate rotation bodies along the inner raceway track in the one-axis direction toward a small-dia. end of the raceway;

the inner ring or the outer ring being provided with a ringlike portion which brings to a stop movement of the intermediate rotation bodies in the axial direction, when the inner ring or the outer ring is rotated in the given direction;

the two single units being arranged so as to face each other in the one-axis direction;

the energizing means being arranged between the inner rings or the outer rings faced each other in the one-axis direction, to energize the inner rings or the outer rings in the axial direction so as to narrow down the spacing of the raceway tracks; and the outer rings or the inner rings which are not energized by the energizing means being stationary so as not to displace in the axial direction.

Operation

Since both the inner and outer raceway tracks are formed of mono-hyperboloids of revolution, the raceway formed of these tracks has a diameter larger at one axial end side than at the other end. Further, since the intermediate rotation bodies are disposed slanted to sections including the center axis of the bearing, when the inner (or outer) rings are rotated, the intermediate rotation bodies will not only roll on the inner and outer ring raceway tracks while keeping line contact with them and being guided by them, but also will tend to advance in the axial direction. But, since the senses of the advancements of the intermediate rotation bodies at the inner and outer raceway tracks are opposite to each other, the inner rings and the outer rings would be separated away from each other in the axial direction by the intermediate rotation bodies.

In this case, since the inner rings (or the outer rings) are to be rotated in a given direction which will cause the intermediate rotation bodies to be moved on the inner ring raceway trakcs toward the smaller diameter ends, the above separation force tends to move the inner rings to the larger diameter ends of the raceway, and the outer rings to the smaller diameter ends, thus invariably resulting in a generation of an action which tends to widen the gap of the raceway.

On the other hand, the bearing single units each including the inner and outer ring and the intermediate rotation bodies are disposed opposite to each other in the axial direction, and one pair of the outer rings (or the inner rings) facing each other are fixed together to a bearing assembly case with the other pair being energized in the axial direction by the energizing means so as to narrow down a gap of the raceway. Therefore, the above separation force cannot remove away the inner rings and outer rings from each other, resulting in a rotation of the intermediate rotation bodies floating on the raceway tracks while the inner rings (or the outer rings) are being subjected to a separation force from one sense and an energizing force from the other opposite sense.

Such being the case, the intermediate rotation bodies would be subjected to forces each in opposite senses of the axial direction from the inner and outer rings as a reaction of a force by which the inner and outer rings tend to be separated away from each other. If the magnitudes of the opposite forces are different, the intermediate rotation bodies may tend to move in the axial direction. When the intermediate rotation bodies are of conical shape, they may be subjected to an additional force pushing out them from the smaller dia. end side to the larger dia. end side, thus resulting in an axial movement depending on which is larger. The ringlike portions or the flanges on the inner rings end or the outer ring end are provided to bring such a movement of the intermediate rotation bodies to a stop in position, thus preventing the intermediate rotation bodies from being driven away from the raceway.

Next, the magnitude of the above separation force produced on the contact line of the intermediate rotation bodies with the inner and outer rings depends on the contact condition. In other words, since convexed portions of the intermediate rotation bodies contact with convexed portions of the inner rings while they contact with concaved portions of the outer rings, a contact surface pressure produced when a radial load is applied on the bearing assembly may be larger in the side of the inner raceway track, thus producing a larger separation force on the inner raceway track side. As a result, with intermediate rotation bodies of cylindrical shape, the differential separation force causes the intermediate rotation bodies to slide in the axial direction against the ringlike flange and stop there, thus resulting in the differential force acting between the intermediate rotation bodies and the flanges as contact surface pressure. But, this differential pressure is not so large that frictions at the contact portions cannot be a problem.

On the other hand, with intermediate rotation bodies of conical shape, as described previously, the intermediate rotation bodies are subjected to a push-out force caused by the pressure at the contact portions. But, the contact pressure is reduced by the separation force, and further the differential separation force acts in an opposite direction to that of the push-out force. Therefore, no large contact surface pressure may be produced between the intermediate rotation bodies and the ringlike flanges.

BRIEF DESCRIPTION OF THE DRAWINGS

Now preferable embodiments of the antifriction roller bearing according to the present invention will be described, referring to the accompanying drawing (FIGS. 1 to 11).

EMBODIMENTS

Figure 1:
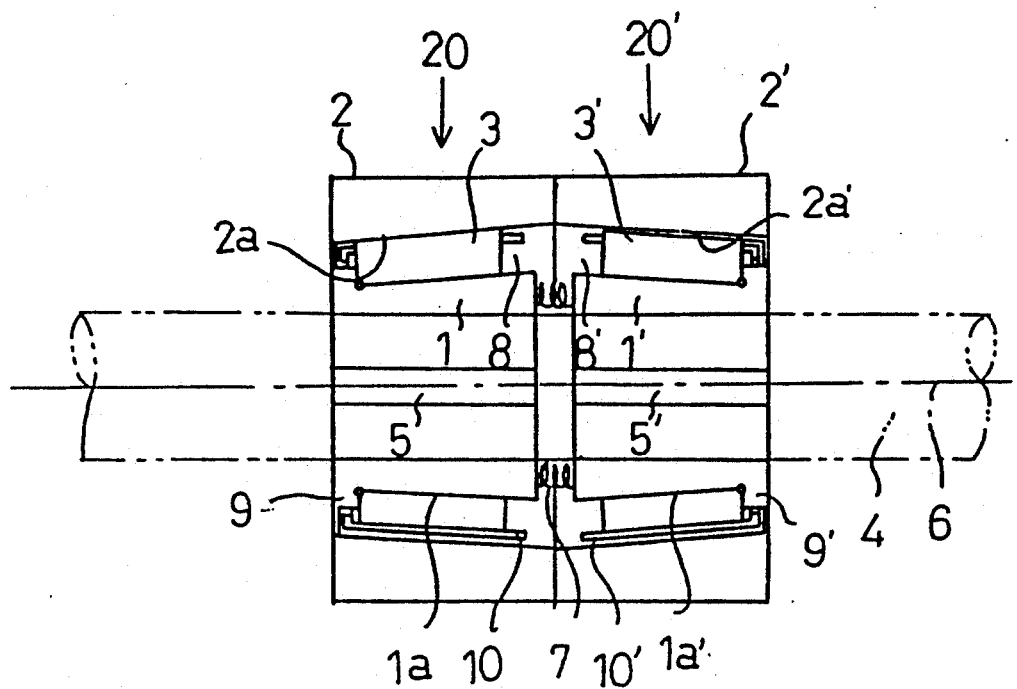
FIG. 1 is a sectional view showing an embodiment of the antifriction roller bearing according to the present invention.

First, the configuration of an antifriction roller bearing according to the present invention will be described using the sectional and perspective views shown in FIGS. 1 to 3.

In the drawings: A single unit 20 (or 20') of an antifriction roller bearing includes an inner ring 1 (or 1'), an outer ring 2 (or 2') and intermediate rotation bodies or rollers 3 (or 3'). This antifriction roller bearing assembly according to the invention consist at least of one set of the two single units 20 and 20' disposed facing each other. Since the two units are of the same configuration, the single unit 20 will be described in detail.

The inner ring 1 may be mounted on a shaft 4 by key 5 engagement. An inner raceway track 1a and an outer raceway track 2a form a raceway 8 for the rollers 3.

Figure 3:
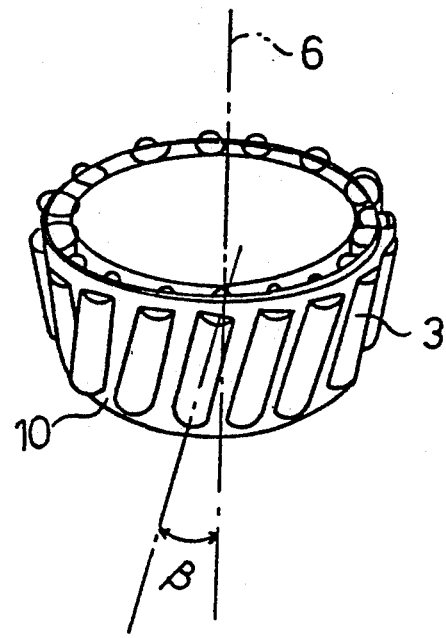

A plurality of the rollers 3 embodying an intermediate rotation bodies are of cylindrical shape, and as shown in FIG. 3, are so disposed in the raceway 8 that they slant to a plane including a central axis 6 of the inner ring 1 at angle $\beta$(e.g., 15°).

A spring 7 used for energizing means is disposed in between the inner rings 1, 1', to push away them all the time so as to narrow a gap of the raceway 8 or separate away the inner rings 1, 1' from each other.

The inner ring 1 is provided with a ringlike flange 9, to restrict an axial movement of the rollers 3 when the inner ring 1 is rotating and the rollers 3 rotates about their own axes to advance in the axial direction 6. The flange 9 may be provided on the outer ring 2.

In FIG. 3, the rollers 3 are disposed on the inner ring 1 slanting to a plane including a central axis 6 of the inner ring 1 at angle $\beta$. Each position of the rollers 3 is maintained by a retainer 10, thus avoiding their contact with each another. This configuration can prevent adjacent rollers rotating about their own axes in the same direction from running against each another with opposite tangential velocities, thus resulting in their smooth rotations about their own axes and on the inner ring raceway track 1a.

Figure 2:
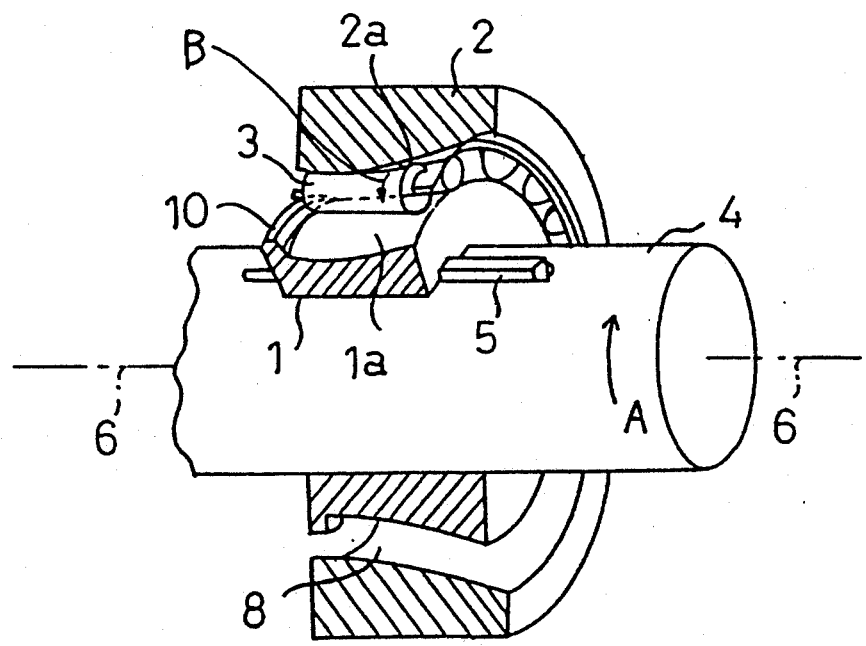
FIGS. 2 and 3 are perspective views showing the arrangement of the main components and the rollers in the above embodiments.

With the antifriction roller bearing assembly, the shaft 4 is rotated invariably to a given direction, that is, in FIG. 2, in the clockwise direction viewed from the right side (in the direction of arrow A). When the shaft 4 rotates the inner ring 1 in A direction, the rollers 3 are guided by the inner ring raceway 1a while keep line contact with the inner ring raceway track 1a, to rotate about their own axes counterclockwise (in the B direction) and advance toward the left side in FIG. 2.

On the other hand, when the rollers 3 rotate in the B direction, the rollers 3 tend to advance to the right side, guided by the outer raceway track 2a while maintaining a line contact with the outer raceway track 2a.

Figure 4:
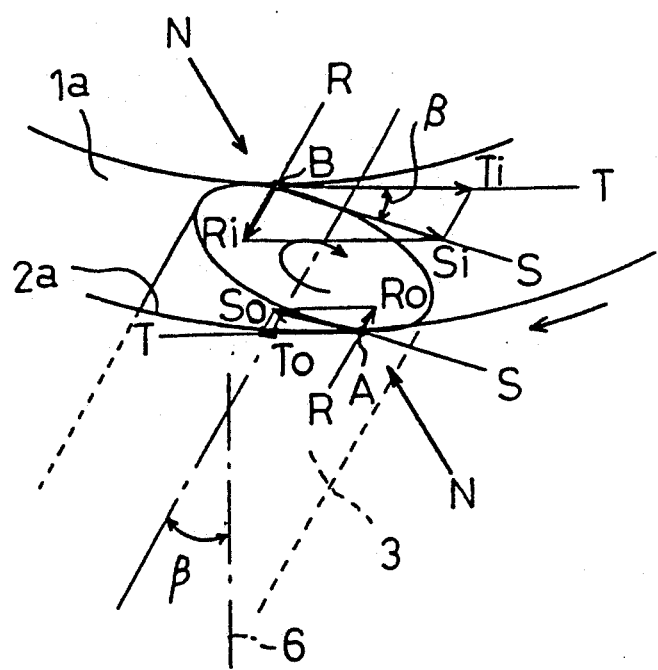
FIGS. 4 and 5 are schematic diagrams showing the relation of forces acting in the antifriction roller bearing.

FIG. 4 is a schematic diagram showing forces acting between the rollers 3 and the inner and outer rings 1 and 2 caused by such movement of the rollers 3 as described above:

Each of the rollers 3 makes a linear contact (strictly speaking, a plane contact with a small width) with the inner and outer raceway tracks 1a and 2a. For simplification, consider contact points A and B on the contact planes. Since the axis 3a of a roller 3 is arranged slanting to a section including the shaft axis 6 by an angle of $\beta$, the roller's rotational direction S has a slant angle of $\beta$ relative to directions T tangential to the raceways 1a and 2a. Therefore, when the rollers 3 are rotating on the raceways 1a and 2a, as shown in FIG. 3, the inner and outer rings 1, 2 would be applied by tangential force components Ti and To and axial force components Ri and Ro.

The axial forces Ri and Ro may tend to separate the inner and outer rings 1 and 2 away from each other in opposite senses of the axial direction of the shaft 4. With this embodiment in which the position of the outer ring 2 is stationary, the inner ring 1 may tend to move to the right in FIGS. 1 and 2, so as to widen the gap of the raceways 8.

Such forces acting on the inner and outer rings 1 and 2 produces a balanced energizing force of the spring 7, thus causing the rollers 3 to float on the inner and outer rings 1 and 2, leading not only to a reduction of rolling contact surface pressure but also to a prevention of such troubles as smearing, galling and hardening of the surfaces in the overload condition.

Figure 5:
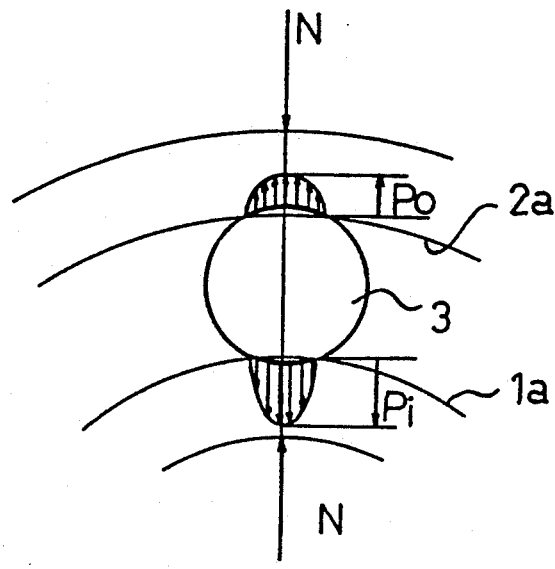

As for the surface contact of the rollers with the inner and outer rings 1 and 2, as shown in FIG. 5, a convexed portion of a roller 3 contacts with a concaved portion of the outer ring raceway track surface 2a, while a convexed portion of a roller 3 contacts with a convexed portion of the inner ring raceway track surface 1a. As a result, a maximum contact surface pressure Pi on the inner ring 1 is larger than a maximum contact surface pressure Po on the outer ring 2. Therefore, in the contact portions of the rollers 3 with the inner and outer rings 1 and 2, the inner ring 1 causes a larger local concentrated strain than the outer ring 2. As a result, when the rollers 3 are rotating while applying a same normal force N on the inner and outer rings 1 and 2, a force component Ri of the rollers 3 tending to move the inner ring 1 in the axial direction is larger than a force component Ro of the rollers 3 tending to move the outer ring 2.

As reactions of such force components Ri and Ro, the rollers 3 would be subjected to forces -Ri and -Ro from the inner and outer rings 1 and 2 which are equal to Ri and Ro in magnitude and opposite in direction. As a result, the rollers 3 tend to advance to the left side (in FIGS. 1 and 2) in the central axis 6 direction while guided by the inner ring raceway track 1a. In order to stop such a movement of the rollers 3, the ringlike flange 9 is provided on the inner ring 1 end portion as described previously.

In this case, the end faces of the rollers 3 come into sliding contact with the flange 9 while rotating about their own axes and in the raceway 8, but the contact force equals (Ri−Ro), thus remaining a small value, so that this sliding friction causes no significant troubles on the bearing.

Accordingly, this antifriction roller bearing according to the invention can solve such problems experienced in the conventional conical roller bearings, as seizures in the high speed rotation due to excessive PV value of the guide flange and failures associated with poor lubrication. Further, the minimized sliding friction loss and the capability of high speed rotation significantly reduce the mechanical loss of the bearing, thus leading to a substantial improvement of bearing efficiency.

Figure 6:
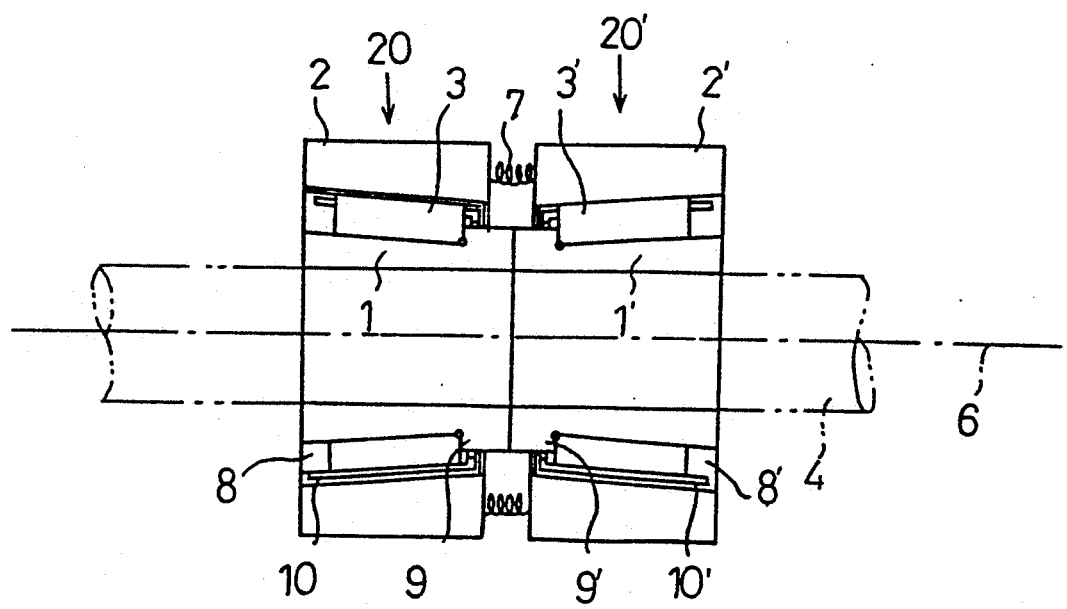
FIG. 6 is a sectional view showing another embodiment of the antifriction roller bearing according to the invention.

FIG. 6 is a sectional view showing another embodiment of the antifriction roller bearing according to the invention:

With the above antifriction roller bearing, the inner ring 1 is fixed on the shaft 4 to prevent an axial displacement of the inner ring 1, while the outer ring 2 can move in the axial direction with the spring 7 provided in between the outer rings 2 and 2'.

Therefore, when the shaft 4 is rotated in one given direction, the rollers 3 and 3' also rotate guided by the inner rollers 1 and 1', thus causing the outer rings 2 and 2' to approach each other so as to widen the raceway gap. As a result, the rollers 3 and 3' will float on the inner rings 1 and 1' and in the outer rings 2 and 2', thus alleviating contact surface pressures between them. With respect to the other points, the configuration and function of the antifriction roller bearing are all the same as the one shown in FIG. 1, thus omitting further descriptions.

Figure 7:
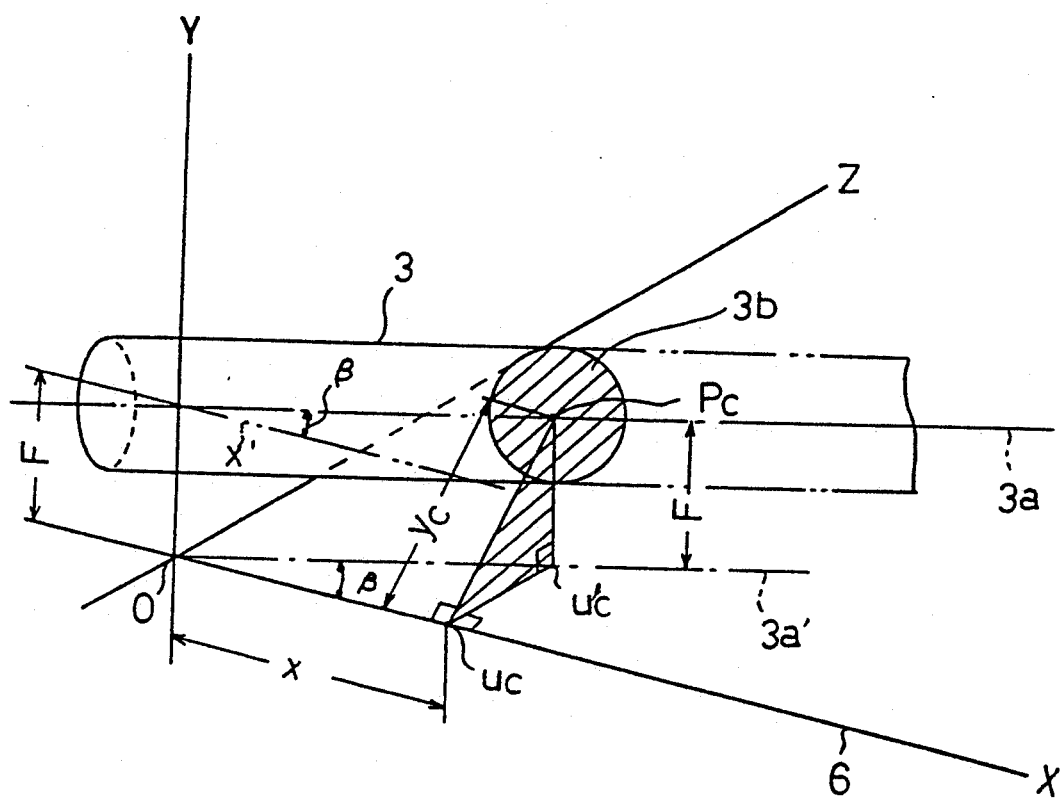
FIGS. 7 to 9 are schematic diagrams showing how to determine the raceway track surface shape of the embodiment shown in FIG. 6.
Figure 8:
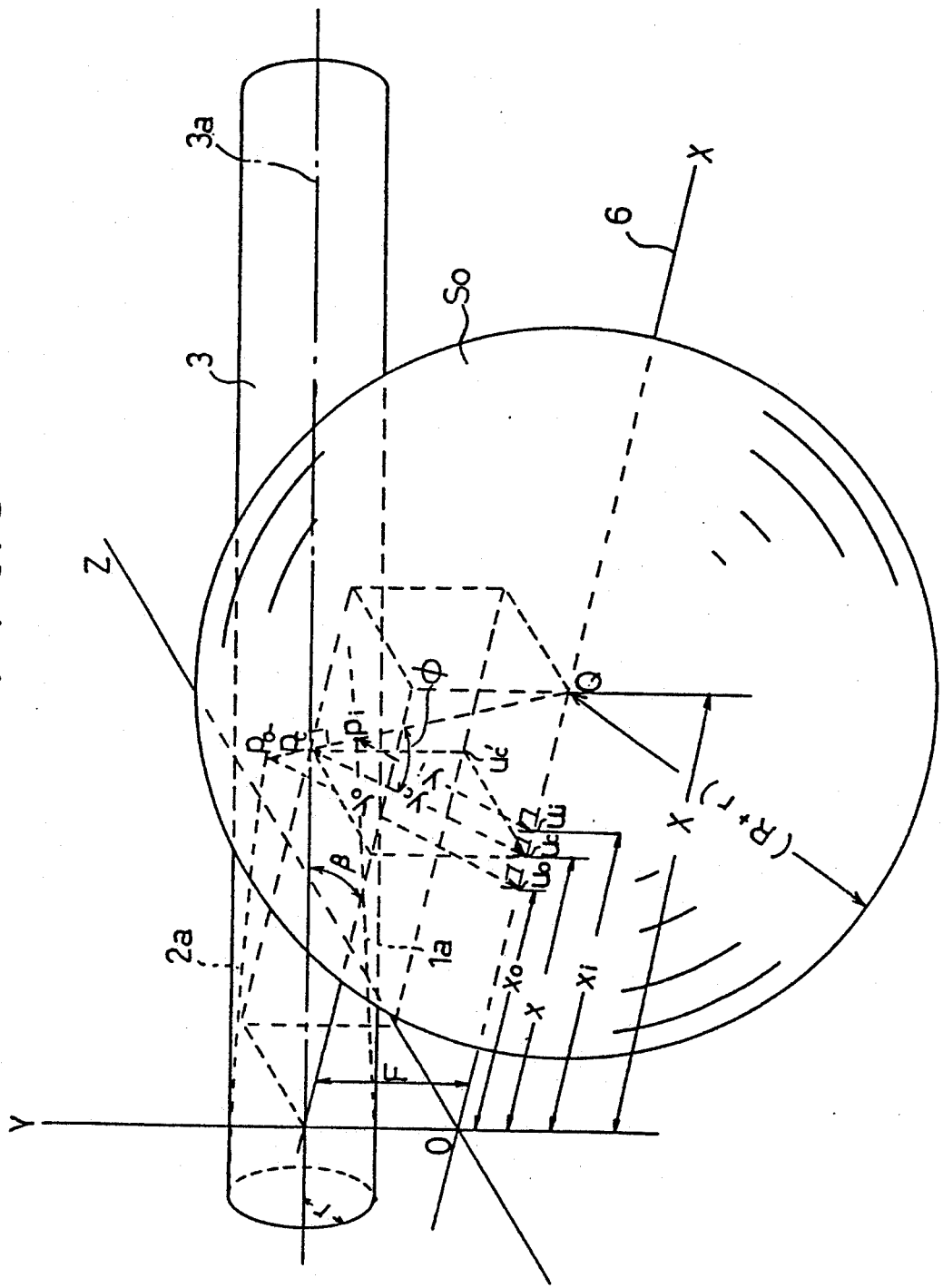
Figure 9:
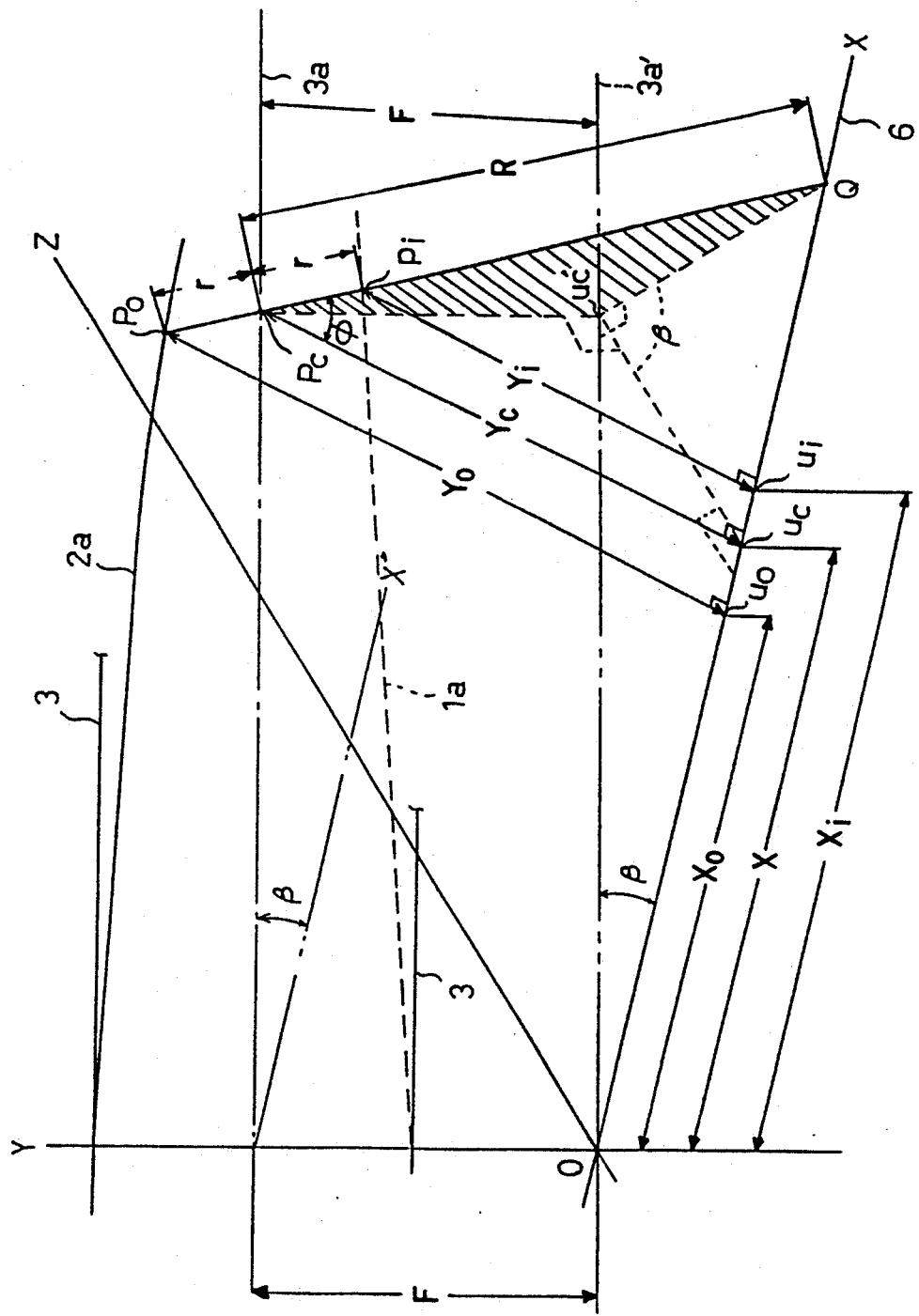

Now, shapes of the inner and outer ring raceway tracks 1a and 2a required for the line contact of the rollers 3 with them will be described as follows:

FIGS. 7 to 9 are explanatory drawings for determining the raceway track surface shapes in the case of cylindrical rollers 3.

FIG. 7 is a perspective view showing X-Y-Z coordinates, in which a roller 3 is so placed that its axis 3a passes through the Y axis a distance F away from the origin O, in parallel to the X-Z plane, slanting to the X-Y plane at an angle of $\beta$. The X axis represent the common axis 6 of the inner and outer rings 1 and 2. The section 3b of the roller 3 shows a section cut by a parallel plane to the Y-Z plane passing the X axis at an arbitrary position x. Points Uc and U'c are respectively intersections with the X axis and the X-Z plane, of perpendiculars drawn from the center Pc of the cross section to the X axis and the X-Z plane. The line 3a' passing the origin O and the point U'c is a projected line of the roller axis 3a to the X-Z plane, forming an angle $\beta$ with the X axis. Apparently referring to FIG. 7, Distance from Uc to U'c = $x \tan \beta$ Distance from Pc to U'c = F Therefore, designating a distance from the rotation axis 6 of the rings (or X axis) to the center Pc of the roller 3 as yc (= $\overline{PcUc}$), $$yc^2 = F^2 + (x \tan \beta)^2$$

Accordingly, $$yc^2/F^2 - x^2/(F/\tan \beta)^2 = 1 \qquad (1)$$

Since the equation (1) is a hyperbola, the axis line of the rollers 3, that is, the center line of the raceway formed with the inner and outer rings 1 and 2 is hyperbolic with respect to the rotation axis 6 of the rings.

FIG. 8 is a drawing for explaining how the rings 1 and 2 come into contact with the roller 3 arranged as above.

Designate as Q an intersection of the axis X with a plane which passes the center Pc of the roller 3 at right angle with the axis 3a of the roller 3. Considering spheres Si and So (only So is shown in FIG. 8) having the same center Q, which are respectively inscribed and circumscribed to the rollers, contact points Pi and Po of the roller 3 with the spheres Si and So would be on a perpendicular connecting the points Q and Pc, respectively the radius r of the roller 3 apart from the point Pc.

Therefore, designating the distance from point Q to point Pc as R, the radii of the spheres Si and So would be respectively (R−r) and (R+r).

Designating as Ui and Uo the intersections of planes passing the points Pi and Po in parallel to the Y-Z plane with the X axis (see FIG. 9), the lengths yi and yo of the segments PiUi and PoUo are respectively distances from the points Pi and Po to the X axis, and the distances xi and xo from the origin O to the points Ui and Uo are respectively the X axis coordinates of the points Pi and Po. Therefore, functions F (xi, yi) and F (xo, yo) represent the curved surface shapes of the raceway tracks 1a and 2a of the inner and outer rings 1 and 2.

FIG. 9 is an enlarged view showing related portions to the determination of these functions.

Since segment QPc (equal to R) is at right angle with the center axis 3a of the roller 3, and the point U'c is an intersection of the perpendicular from the point Pc to the X-Z plane therewith, segment U'cQ is at right angle with the axis 3a'. Therefore, Distance from point O to point Q $$R^2 = (x/\cos\beta)/\cos\beta = x/\cos^2\beta$$
$$= F^2 + \{(x/\cos^2\beta)\sin\beta\}^2$$
$$= F^2 + x^2\tan^2\beta/\cos^2\beta$$

Then, designating an angle QPcUc as $\phi$, since triangle QPcUc is a right angle, $$\cos\phi = \frac{yc}{R} = \frac{\sqrt{F^2 + x^2\tan^2\beta}}{\sqrt{F^2 + x^2\tan^2\beta/\cos^2\beta}}$$

$$\sin\phi = \frac{UcQ}{R} = \frac{x\tan^2\beta}{\sqrt{F^2 + x^2\tan^2\beta/\cos^2\beta}}$$

On the other hand, since the length of segments PcPi and PcPo equal r, and triangles QPiUi and QPoUo are similar to triangle QPcUc, $$xi = x + r\sin\phi = x + xr\frac{\tan^2\beta}{\sqrt{F^2 + x^2\tan^2\beta/\cos^2\beta}} \quad (2)$$

$$xo = x - r\sin\phi = x - xr\frac{\tan^2\beta}{\sqrt{F^2 + x^2\tan^2\beta/\cos^2\beta}} \quad (3)$$

$$yi = yc - r\cos\phi = \quad (4)$$

$$\sqrt{F^2 + x^2\tan^2\beta}\left(1 - \frac{r}{\sqrt{F^2 + x^2\tan^2\beta/\cos^2\beta}}\right)$$

$$yo = yc + r\cos\phi = \quad (5)$$

$$\sqrt{F^2 + x^2\tan^2\beta}\left(1 + \frac{r}{\sqrt{F^2 + x^2\tan^2\beta/\cos^2\beta}}\right)$$

From these above equations, F (xi, yi) and F (xo, yo) are introduced as follows:

$$yi = \frac{\sqrt{F^2 + x^2\tan^2\beta}\left(1 - \frac{r}{\sqrt{F^2 + x^2\tan^2\beta/\cos^2\beta}}\right)}{x\left(1 + \frac{r\tan^2\beta}{\sqrt{F^2 + x^2\tan^2\beta/\cos^2\beta}}\right)} xi$$

$$yo = \frac{\sqrt{F^2 + x^2\tan^2\beta}\left(1 + \frac{r}{\sqrt{F^2 + x^2\tan^2\beta/\cos^2\beta}}\right)}{x\left(1 - \frac{r\tan^2\beta}{\sqrt{F^2 + x^2\tan^2\beta/\cos^2\beta}}\right)} xo$$

These equations express only that the inner and outer raceway tracks 1a and 2a have shapes of quadratic curved surface. Obtaining ratios of (xi-x)/(yi-yc) and (xo-x)/(yo-yc), from the equations (2) to (5), $$\frac{xi - x}{yi - yc} = \frac{r\sin\phi}{-r\cos\phi} = -\frac{x}{yc}\tan^2\beta$$

$$\frac{xo - x}{yo - yc} = \frac{-r\sin\phi}{r\cos\phi} = -\frac{x}{yc}\tan^2\beta$$

Since the relation of x and yc is hyperbolic from the equation (1), and $\tan^2\beta$ in the above equations is constant, the relations of xi and yi as well as xo and yo are hyperbolic. As a result, the inner and outer raceway tracks 1a and 2a are mono-hyperboloids of revolution about the common axis 6.

Assuming for example $$yi^2/ai^2 - xi^2/bi^2 = 1$$

$$yo^2/ao^2 - xo^2/bo^2 = 1$$

F=9, r=1.5, and $\beta$=15°, ai, bi, ao and bo are respectively calculated to be 7.5, 30.7, 10.5 and 36.2, thus giving the inner and outer raceway track surfaces as mono-hyperboloid.

Figure 10:
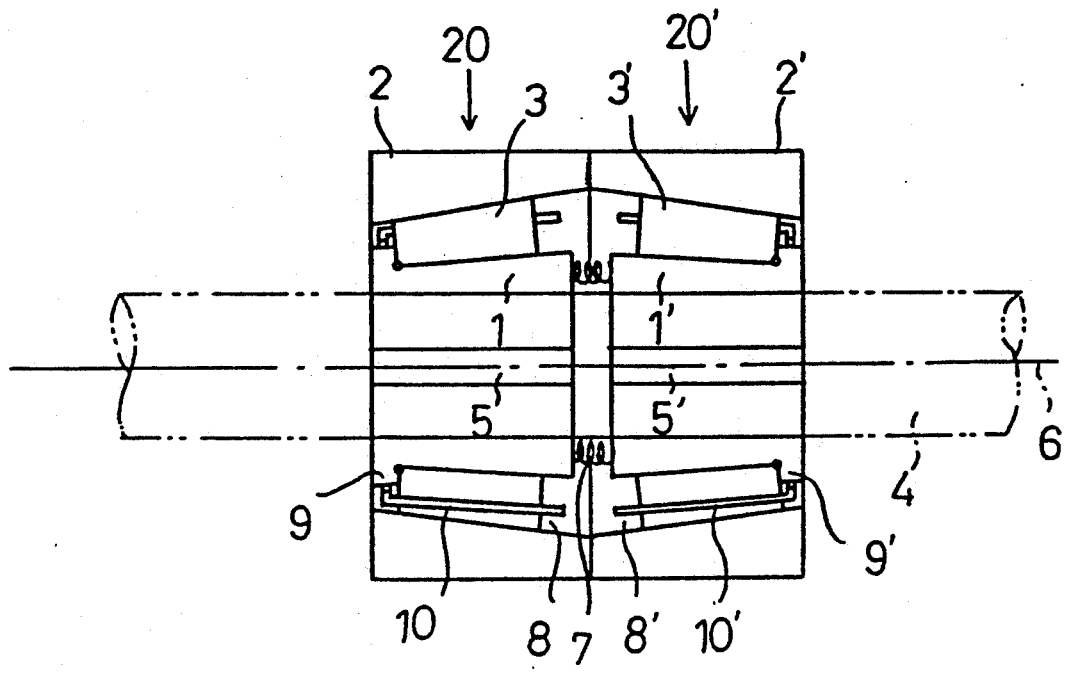
FIG. 10 is a sectional view showing a separate embodiment of the antifriction roller bearing according to the invention.

Next, an antifriction roller bearing assembly in which the bearing single unit has an intermediate rotation bodies with a conical shape of rollers will be described:

FIG. 10 is a sectional view showing an embodiment of the above antifriction roller bearing assembly, corresponding to FIG. 1. The assembly is different from the one in FIG. 1 only in that the rollers 3 and 3' are of conical shape instead of cylindrical shape.

When the conical rollers are used, rolling performance of the assembly is further enhanced.

As compared to the common cylindrical roller bearings, the conical roller bearings generally involve the problem of large sliding friction at the larger diameter sides of the rollers, but this antifriction roller bearing assembly according to the invention solved this problem.

Figure 11:
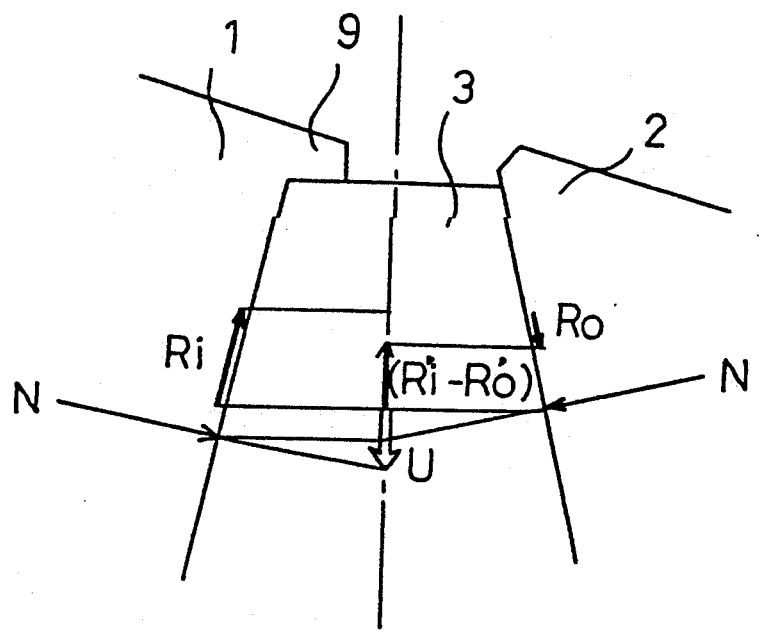
FIG. 11 shows how forces act on the rollers in the embodiment shown in FIG. 10.

This solution will be described referring to FIG. 11. FIG. 11 is a schematic diagram showing how forces act on the rollers in the embodiment shown in FIG. 10.

As described previously, the rollers 3 and 3' are subjected to the axial components of forces −Ri and −Ro from the inner and outer rings 1 and 2. Since Ri>Ro, as shown in FIG. 11, the roller 3 is subjected to an axial component of force (Ri'−Ro') which tends to displace the roller in the axial direction toward the small diameter end. Further, since the roller 3 is of conical shape, as shown in FIG. 11, the roller 3 is subjected to an axial component U of normal forces N acting on the contact surface, which tends to displace the roller in the axial direction toward the large diameter end.

As described above, the roller 3 may slide toward the smaller or larger diameter end, depending on which is larger, force (Ri'−Ro') or U. And, a ringlike flange 9 is provided on the side of the inner ring 1 or the outer ring 2 toward which the roller 3 may displace. With the embodiment shown in FIG. 10, an assumption of (Ri'−Ro')>U is made, thus providing the flange 9 on the roller's small diameter side end of the inner ring 1.

As described above, with the conical roller bearing according to the invention, the large pull-out force U acting on the large diameter side end of the roller 3 in the conical roller bearing according to the prior art is substantially reduced, thus permitting only an auxiliary flange to be provided on the large (or small) diameter end side of the roller 3, resulting in a smaller PV value due to the sliding friction which will not restrict the load carrying capability of the bearing.

Since the generator of conical roller is a slanting line, the shapes of the inner and outer ring raceway tracks in the conical roller bearing are also of mono-hyperboloid of revolution like the cylindrical roller, but the hyperboloid is slanted by the slope of the conical generator.

In this connection, the bearing in FIG. 10 has a configuration corresponding to the one in FIG. 1, but may has a configuration corresponding to the one in FIG. 6.

Further, with the above embodiments, the shaft 4 is connected to a power system and rotated with the inner rings 1. But, alternatively, the boss side (not shown) and the outer rings 2 may be rotated.

Furthermore, in the above embodiments the intermediate rotation body is of a cylindrical or conical shape, but an hour-glass or convenxed drum shape may be used.

When a roller surface is of an hour-glass shape which is formed by revolving a part of ellipse about an outside axis, the inner ring surface is made into a cylindrical shape while the outer ring surface is made into a curved surface formed by combining an ellipsoid of revolution and a hyperboloid of revolution. When a roller surface is of a convexed drum shape which is formed by revolving a part of ellipse about its center axis, the outer ring surface is made into a cylindrical shape while the inner ring surface is made into a curved surface formed by combining an ellipsoid of revolution and a hyperboloid of revolution.

Effect

As described above in detail, with the antifriction roller bearing according to the present invention:

The intermediate rotation bodies are arranged slanted to the inner and outer rings so as to have a line contact with the raceway tracks, the inner and outer rings are separated away so as to have the intermediate rotation bodies float from them, and the axial movements of the intermediate rotation bodies are uniformed. Therefore, the antifriction roller bearing according to the invention can improve the bearing load carrying capability and the rolling performance, thus minimizing the sliding friction, resulting in not only prevention of the occurrence of failures associated with seizure or poor lubrication, but also a high bearing efficiency most suitable for high speed rotation.

What is claimed is:

1. An antifriction roller bearing comprising:
   two sets of single units each consisting of an inner ring, an outer ring and intermediate rotation bodies, and one set of energizing means; and
   said inner ring being provided with an inner raceway track of mono-hyperboloid of revolution about one axis;
   said outer ring being provided with an outer raceway track of mono-hyperboloid of revolution about said axis;
   said inner raceway track and said outer raceway track being oppositely faced with each other to form a raceway whose diameter is larger at one end than at the other end;
   the center axes of said intermediate rotation bodies with a cylindrical or conical rolling surface being arranged in a circumferential direction of said raceway at an angle to a cross section including said axis, and the surface of said intermediate rotation bodies being arranged so as to come into linear contact with said inner raceway track and said outer raceway track;
   said inner ring or said outer ring rotating only in such a given direction as to roll said intermediate rotation bodies along said inner raceway track in said one-axis direction toward a small-dia. end of said raceway;
   said inner ring or said outer ring being provided with a ringlike portion which brings to a stop movements of said intermediate rotation bodies in said axial direction, when said inner ring or said outer ring is rotated in said given direction;
   said two single units being arranged so as to face each other in said one-axis direction;
   said energizing means being arranged between said inner rings or said outer rings faced each other in said one-axis direction, to energize said inner rings or said outer rings in said axial direction so as to narrow down the spacing of said raceway tracks; and
   said outer rings or said inner rings which are not energized by said energizing means being stationary so as not to displace in said axial direction.

* * * * *